United States Patent [19]

Farnsworth

[11] 4,037,360
[45] July 26, 1977

[54] RAFT APPARATUS FOR GROWING PLANTS BY MEANS OF WATER CULTURE

[76] Inventor: Robert S. Farnsworth, 99 Somerset Road, Piedmont, Calif. 94611

[21] Appl. No.: 642,554

[22] Filed: Dec. 19, 1975

Related U.S. Application Data

[63] Continuation-in-part of Ser. No. 537,198, Dec. 30, 1974, Pat. No. 3,927,491.

[51] Int. Cl.² ............................................. A01G 31/00
[52] U.S. Cl. ............................................ 47/63; 47/86
[58] Field of Search ................... 47/1.2, 34, 34.13, 17, 47/63, 86

[56] References Cited

U.S. PATENT DOCUMENTS

| | | | |
|---|---|---|---|
| 2,175,113 | 10/1939 | Fischer | 47/1.2 |
| 2,531,562 | 11/1950 | Eve | 47/34.13 |
| 2,807,912 | 10/1957 | Bjorksten | 47/1.2 X |
| 3,456,385 | 7/1969 | Plath | 47/1.2 |
| 3,513,593 | 5/1970 | Beck | 47/34.13 |
| 3,579,907 | 5/1971 | Graves | 47/17 |
| 3,667,159 | 6/1972 | Todd | 47/34.13 |
| 3,798,836 | 3/1974 | Rubens et al. | 47/1.2 |
| 3,810,329 | 5/1974 | Lecuru et al. | 47/34.13 |
| 3,830,013 | 8/1974 | Lesley | 47/1.2 |
| 3,927,491 | 12/1975 | Farnsworth | 47/1.2 |

FOREIGN PATENT DOCUMENTS

| | | | |
|---|---|---|---|
| 932,961 | 9/1973 | Canada | 47/1.2 |
| 1,949,462 | 4/1971 | Germany | 47/1.2 |
| 2,037,013 | 2/1972 | Germany | 47/1.2 |
| 1,031,309 | 6/1966 | United Kingdom | 47/1 |
| 1,053,508 | 1/1967 | United Kingdom | 47/1 |
| 1,313,121 | 4/1973 | United Kingdom | 47/1 |

OTHER PUBLICATIONS

Vegetables & Annuals from Cuttings, Albert, Garden Journal, Apr. 1976, N.Y. Bot. Garden, pp. 68–69 cited.

*Primary Examiner*—Robert E. Bagwill
*Attorney, Agent, or Firm*—Warren, Chickering & Grunewald

[57] ABSTRACT

Apparatus for growing plants by means of water culture or hydroponics is disclosed. The apparatus includes raft means formed to receive and support the plants on a nutrient solution with their root systems extending therethrough while they grow to maturity. The rafts are formed for positioning in close proximity during all stages of plant growth to maximize the plant density per unit area of the solution. The rafts are preferably constructed for seed germination as well as for growth of seedlings to mature plants. Buoyancy of the rafts is increased during plant growth by placing a small raft on a larger raft or auxiliary buoyancy means.

7 Claims, 6 Drawing Figures

RAFT APPARATUS FOR GROWING PLANTS BY MEANS OF WATER CULTURE

BACKGROUND OF THE INVENTION

This application is a continuation-in-part application of co-pending application Ser. No. 537,198, filed Dec. 30, 1974 (now U.S. Pat. 3,927,491), and entitled "PROCESS AND APPARATUS FOR GROWING PLANTS."

Traditional plant farming prodcedures are based upon the concept of spatially fixed plants. This is particularly exemplified by lettuce farming in which small seedlings are spaced apart by a distance sufficient to accommodate full growth of the lettuce plant. For plants such as lettuce, which require a substantial lateral area relative to the plant stem during mature plant stages and a relatively insubstantial lateral area during seedling stages, this commitment of space during the seedling and early growth stages results in a very substantial loss in the space productivity of the farmland.

The long term average yield for field grown lettuce is about 1120 cartons (24 heads/carton) per hectare. In recent years more intensive farming has brought the productivity of many fields up to about 1480 cartons per hectare or ⅓ square meter per head. Since in most areas there is about a 70 day summer growing period, the space prodictivity of even highly efficient fields is aout 20 square meter days per head. Where climate permits, field grown lettuce can be double cropped wih a total yield per year of about 2970 cartons per hectare.

Using the apparatus of th present invention, plants can be grown by means of water culture on a plurality of rafts with the attendant result that the space productivity for lettuce to be increased seven-fold over a 70-day growing cycle and 15 to 20-fold on an annual basis.

The water culture or hydroponic growth of plants has been accomplished for more than 100 years. Hydroponic systems have included the germination of seedlings for testing purposes on floating wafers (U.S. Pat. No. 2,175,113). Such wafers, however, are not intended to support the plant through its full growth, and the seedlings are transplanted to spatially fixed locations.

A ring-like member has been employed in connection with the growth of an avocado plant from a seed (U.S. Pat. No. 3,830,013), and plant cuttings have been supported on inflatable tubes for the growth of roots U.S. Pat. No. 3,456,385). These devices are designed primarily to accommodate changes in water level. Additionally, U.S. Pat. No. 3,798,836 discloses the growth of green beans on members formed from an open called polyurethane foam. This system merely uses the foam members as a plant support in place of trays, granules of the like. Still further, U.S. Pat. No. 3,579,907 discloses a system in which floating trays are emplyed to grow plants. The trays are employed to catch and trap nutrient solution, which is sprayed upon the plants. Similarly, in U.S. Pat. No. 3,230,967, trays containing plants are fed nutrient solution from above, and the trays are positioned on a large floating processing station.

Accordingly, it is an object of the present invention to provide raft apparatus for growing plants by means of water culture which substantially enchances space productivity.

It is another object of the present invention to provide apparatus suitable for growing plants which require a substantial lateral area relative to the plant stem for growth during mature stages and a relatively insubstantial lateral area during seedling plant stages.

Still a further object of the present invention is to provide apparatus for growing plant which will enable the annual production of a greater number of plants than by conventional techniques.

Another object of the present invention is to provide raft apparatus for growing plants by means of water culture which will enable production of the plants on a continuous processing basis employing material handling techniques, and which will eliminate transplanting steps involving high labor costs.

It is a further object of the present invention to provide raft apparatus for growing plants which is simple and inexpensive to contruct; enables a full utilization of plant by-products, such as roots; and can be employed during the full year and in close proximity to the market area.

The apparatus of the present invention for growing plants has other objects and features of advantage, some of which will be apparent frpom and are set forth in detail in the following detailed description and accompanying drawing.

DESCRIPTION OF THE PREFERRED EMBODIMENTS

Figure 2:
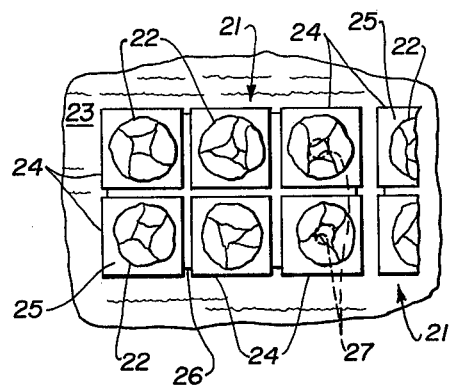
FIG. 2 is a top plan view of the raft means of FIG. 1.

Referring now to the drawing, the hydroponic or water culture apparatus of the present invention can be described in detail. Raft means, generally designated 21, includes a body formed to float on a nutrient solution 23 in a stable position. Buoyancy is preferably achieved by forming the body of raft means 21 of a buoyant material such as polystyrene or other plastic foam, cork, wood, or the like. Floatingly supported on raft means 21 are at least one, and in this case, a plurality of plants 22.

The body of raft means 21 is further formed with at least one generally vertically oriented channel 27 extending from a foliage supporting upwardly facing side 25 through the body of the raft to a nutrient solution contacting downwardly facing side 30 of the rafts. Channel 27 is further dimensioned for receipt of stem 29 of the plant with root system 28 depending downwardly therefrom into nutrient solution 23. Moreover, channel 27 is transversely dimensioned to prevent the foliage of the plant from passing downwardly through the channel or opening 27.

In order to prevent what can be debilitating contact of plant foliage with nutrient solution 23, the body of raft 21 extends laterally of channel 27 and the body of the raft is sufficiently buoyant to support the plant foliage above nutrient solution 23.

Figure 1:
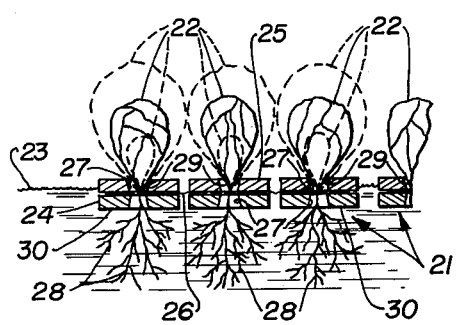
FIG. 1 is a side elevational view, partially in cross-section, of raft means constructed in accordance with the present invention.

As shown in FIGS. 1 and 2, and in order to enable efficient growth and handling of a multiplicity of plants, particularly in seedlng stages, raft means 21 is preferably comprised of six sub-rafts 24 interconnected by frangible means, such as sheet or element 26. Each of sub-rafts 24 is formed with a generally vertically oriented channel 27 in which a plant 22 is disposed, and it will be understood that the expression "raft mens" shall include a single raft or a plurality of sub-rafts which are interconnected.

Raft means 21 with its plurality of sub-rafts 24, is constructed so that plants 22 are spatially fixed relative to each other when the sub-rafts are interconnected. Some plants have the majority of their increase in bulk in the vertical direction, such as grasses, carrots, green onions, etc., and they can be conveniently grown in soil or in fixed lateral positions. When the plant expands or increases in bulk laterally of the stem 29, a fixed spatial relationship between the plants can only be tolerated if the distance between plants in sufficient for the mature plant. Thus, crops such as lettuce, cabbage, spinach, many flowers, etc., must have substantial room to expand during growth.

Raft means 21, as shown in FIGS. 1 and 2, therefore, is constructed of a size designed primarily for germination and growth of the plants 22 during seedling stages until the foliage or roots of the adjacent plants reach a lateral development at which they begin to interfere with the foliage or roots of other plants. In FIG. 1 the progression of lateral development is shown in dotted lines from the earliest seedling stage to the stage at which the plants beginning to interfere with the growth of each other.

The apparatus of the present invention employs a plurality of separate raft means 21 which are positioned on nutrient solutions 23 in close proximity for maximum plant density per unit area of the nutrient solution. The raft means, however, provide lateral mobility for the plants, unlike a soil medium, and enable the plants to be laterally separated during growth. Thus, each of raft means 21 in FIGS. 1 and 2 can be severed into six sub-rafts 24 at the frangible connections 26 when the plants reach a stage at which they are contacting each other. Once severed, the sub-rafts 24 are free to move laterally as the plants grow. In order to accommodate this lateral movement, of course, the total effective area of nutrient solution 23 must be increased. Raft means 21, therefore, and initially be formed to carry a multiplicity of seedling plants for convenience of handling, and subsequently the sub-rafts 24 can be severed from each other to allow lateral expansion of individual plants during growth.

The plants are maintained on the nutrient solution in as high a density as can be attained, which density is determined by the larger of the lateral area of raft units 24 and the lateral area of plants 22. In the initial growth stages of the seedling, the size of raft units 24 determines the spatial density. Once the plant grows laterally from stem 29 a distance greater than the lateral area of units 24, the plant density is determined by the lateral area of the plants. This latter condition, as long as the plants are not forced together in a manner inhibiting growth, is preferred for maximum space productivity. As growth increases, each raft 24 can be laterally displaced and the nutrient solution effective area increased so that during substantially the entire growth cycle the area of nutrient solution will not be substantially greater than and correspond to the lateral area of the plant.

The productivity of each square foot of space can, therefore, be greatly increased over the productivity of such space when conventional farming techniques are employed by using the plant growing apparatus of the present invention.

After the plant has become large enough so as to begin to affect the growth of the adjacent plants, rafts 24 can be severed from each other, and the buoyancy and stability of each of sub-rafts 24 can be increased. This step of increasing the buoyancy of the raft means is preferably accomplished by placing sub-raft 24 on an auxiliary raft or buoyancy means 31 adapted to receive the sub-raft. This step is referred to herein as "transrafting" and best may be seen in FIG. 3. The transrafting is far more efficient and less costly than is transplanting.

Each of auxiliary rafts 31 is formed to assist in the buoyant support of sub-raft 24 by providing auxiliary stability and buoyancy for the sub-rafts. Moreover, the auxiliary buoyancy means is also formed with a centrally disposed, generally vertically oriented, auxiliary channel or opening 32 through which root system 28 of the plant may pass. In order to secure raft means 24 to auxiliary raft 31 against relative lateral displacement, it is preferable that registration means, such as a notch or recess 33, be formed proximate the top surface of raft 31. Registration recess 33 insures general alignment of opening 27 with opening 32. Notch or recess 33 can have parallel side walls or be tapered, and it is preferable that it substantially conform to the peripheral shape of raft 24. If raft 24 is circular or of other polygonal shape, notch 33 can be correspondingly shaped.

Figure 3:
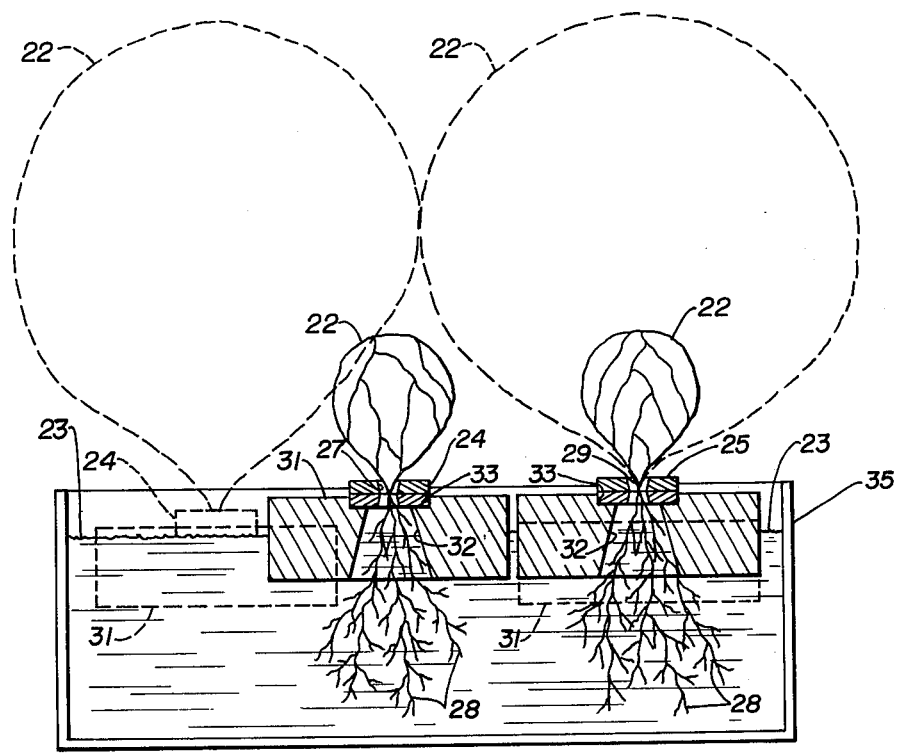
FIG. 3 is a side elevational view, in cross-section, showing the raft means of FIG. 1 placed upon auxiliary buoyancy or raft means.

As the plant grows to the size shown by broken lines in FIG. 3, rafts 31 will be downwardly displaced in the water under the incresed weight of the plants. Additonally, at least one or both of rafts 31 will have to be laterally displaced (shown by dotted lines in FIG. 3). The net effect, however, will be to laterally displace the rafts as the plants grow laterally.

Since rafts 31 are initially placed in substantially abutting relation, the effective area of the nutrient solution must be increased once plants 22 grow beyond the outer periphery of rafts 31. This can be done by increasing the area of the nutrient solution, as for example by placing the rafts in a larger water culture tank 35.

At some point plants 22 may increase in size to a sufficient degree so as to require the addtion of further buoyancy to the auxiliary raft means 31. This can be easily accomplished by placing raft 31 in still a larger auxiliary raft. Similarly, plants 22 may extend beyond the periphery of raft means 31 to a degree tending to cause the raft means to become top heavy and unstable. Plants 22, however, will tend to provide mutual support once they grow beyond the periphery of raft 31. It is possible, however, to further stabilize or add stability to the individual raft means by interconnecting rafts for mutual support or adding auxiliary floatation having a greater lateral area.

Figure 4:
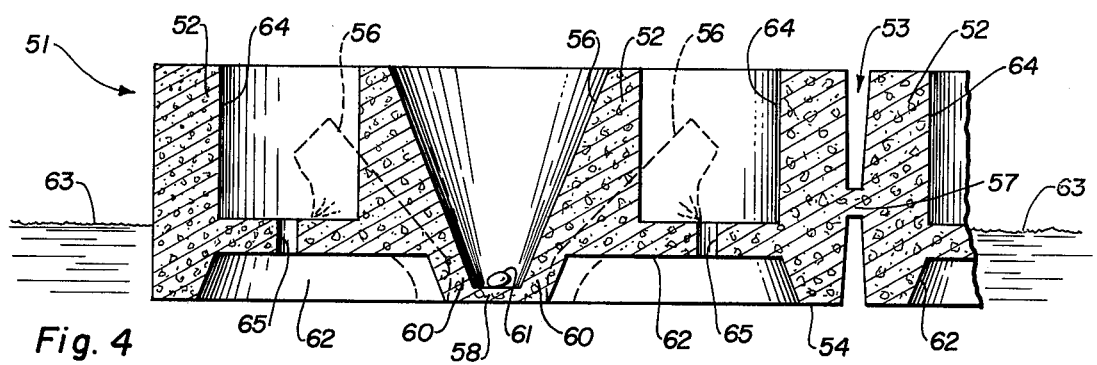
FIG. 4 is a fragmentary side elevational view of an alternative embodiment of raft means constructed in accordance with the present invention.

Referring now to FIG. 4, an alternative embodiment of the raft means of the present invention is disclosed. Raft means 51 is formed with a body 52 having a plurality of division forming means 53 dividing body 52 into a pluraltiy of sub-rafts 54, each with plant receiving vertical channels 56 therein. Instead of forming sub-rafts 54 by connecting elements together by a frangible sheet, as is shown in FIGS. 1 and 2, the sub-rafts 54 in FIG. 4 are integrally formed from a molded (or machined) foam material. Thus, division means 53 are provided by weakened planes or reduced sections, with the frangible web 57 of foam material connecting adjacent sub-rafts at the reduced sections permitting the sub-rafts to be easily broken apart in a controlled manner. When the adjacent plants grow laterally to a degree causing the foliage or roots to interfere with growth, sub-rafts 54 can be broken apart at webs 57 and allowed to float separately and/or transrafted to an auxiliary raft.

In order to facilitate seed germination, it is a further important feature of the present invention that body 52 of the raft means 51 includes a partition means 58 which extends transversely across channel 56 at a height in channel 56 causing the partition to be in contact with nutrient solution 63. The partition should have a thickness sufficient to support the plant seed during germination and be porous or absorptive enough for the communication of nutrient solution to the top side of the partion by capillary action. Such communicaion of nutrient solution through partition 58 is desired to facilitate seed germination. Moreover, body 52 may be formed with a lower annular recess 62 defining with channel 56 a conical body portion 60 having reduced thickness or cross-section so that nutrient solution can be absorbed thereacross to enable germination of seed 61. Extending upwardly from recess 62 into a superimposed upper annular recess 64 are openings or holes 65 which permit the escape of air that would otherwise be trapped in lower annular recess 62 and allow contact between the nutrient solution and conceal body portion 60.

It should also be noted that seeds 61 can also be germinated by watering with nutrient solution from above. Additionally, a wick, not shown, may extend from seed 61 up and out of channel 56, over the edge of raft means 51, and into nutrient solution 63 to effect germination without absorption through the body 52 of the raft means. Alternatively, a wick may extend through membrane or partition 58. Still further, pre-soaking of raft means 51 in a nutrient solution can be used to enhance absorption and seed germination.

Regardless of the manner by which nutrients are communicated to seed 61, partition 58 must be sufficiently thin to be frangible or permeable and compressible upon growth of the plant root system so that the roots will grow down through the partition into the nutrient solution. Partition 58 is gradually broken away and/or compressed by the plant root system and provides a means by which the plant is held against dropping down through opening or channel 57 until the foliage is large enough to prevent such an occurrence.

It has been found to be highly advantageous to form raft means 51 from a low density plastic foam, such as open celled, polystyrene foam having a density of less than about 45 kilograms per cubic meter. Partition 58 has been found to have sufficient absorption and frangibility or compressiveness when formed from polystyrene foam having a thickness of about 5 millimeters or less. It should be noted, however, that lettuce will grow through a polystryrene partition 58 having a thickness of 13 millimeters, although watering or misting from above should be used. Best results have been achived when the foam is molded at a density of about 30 kilograms per cubic meter and a partition thickness of about 3 millimeters.

As is true in connection with the raft means of FIGS. 1 and 2, it has been found most advantageous to form the plant stem receiving channels 56 as a frusto-conical upwardly facing recess. The upwardly facing frusto-conical channel 56 allows the use of a seeding machine to drop seeds into a multiplicity of side-by-side rafts simultaneously with the frusto-concial surface guiding the seeds down to rest on partition 58.

Figure 5:
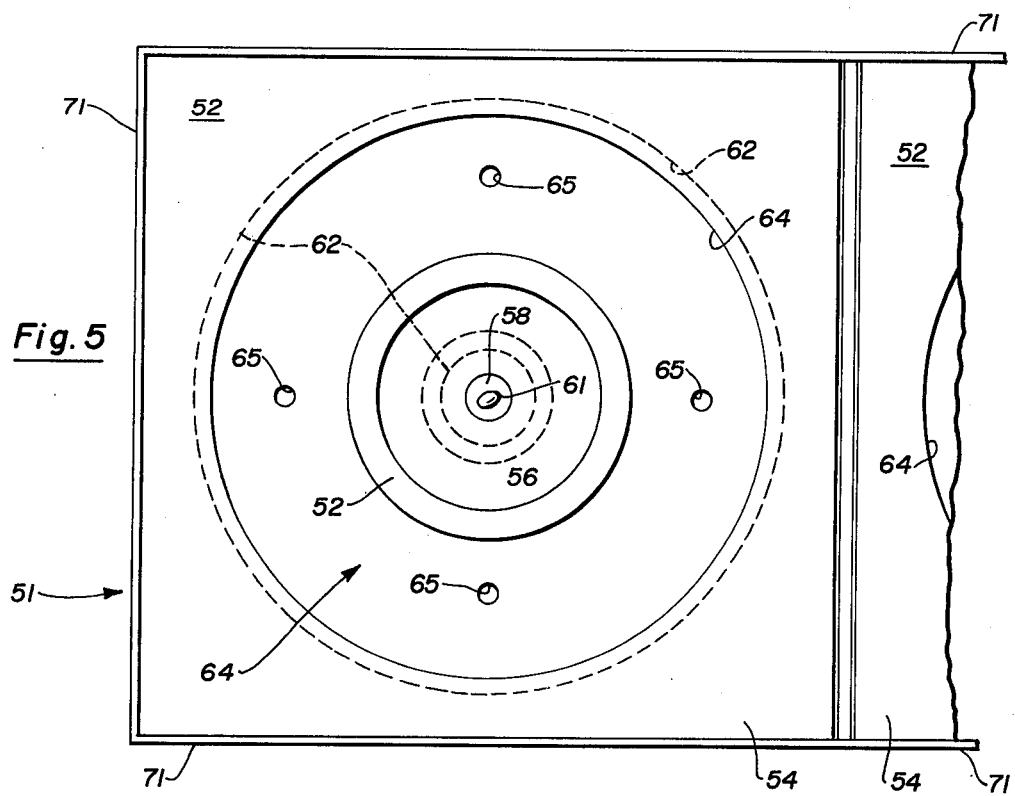
FIG. 5 is a top plan view of the raft means of FIG. 4.

The frusto-conical shape of channel 56 also accommodates early expansion of the plant stem during growth. The raft means 51 of FIGS. 4 and 5 is further provided with an upper annular recess 64 which surrounds channel 56. The primary purpose of recess 64 is to allow the walls of body 52 defining channel 56 to be outwardly displaced, as is shown in FIG. 4 by dotted lines, as the plant stem grows laterally. Thus, foam body 52 defining channel 56 is gradually crushed and/or compressed outwardly during plant growth, and recess 64 lowers the resistance to such outward displacement by providing space into which the walls defining channel 56 can move.

In FIG. 4 adjacent sub-rafts 54 comprising raft means 51 are held together by web 57 at weakened plane 53. In FIG. 5, however, a plurality of independent sub-rafts 54 are held together by band or tie means 71, which preferably encircles the periphery of the sub-rafts. Instead of breaking the sub-rafts apart at frangible web 57, the sub-rafts 54 can be separated by simply cutting band or tie means 71. In this regard it has been found that an elastic band or non-resilient tie can be used to temporarily bind sub-rafts 24 together.

Figure 6:
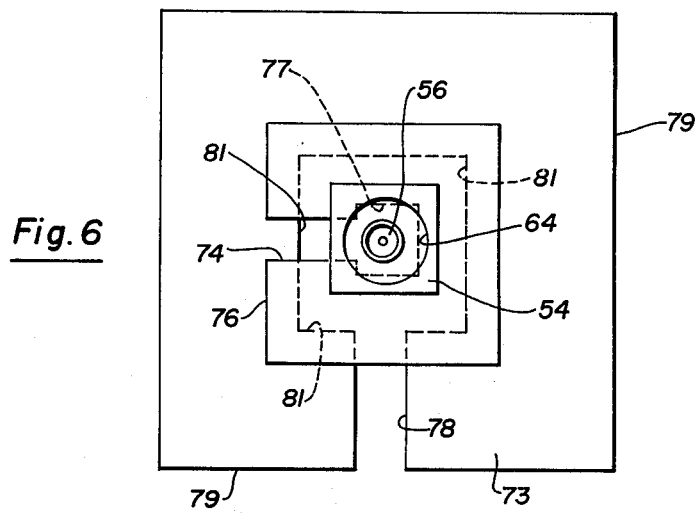
FIG. 6 is a reduced top plan view of the raft of FIG. 4 when positioned on auxiliary buoyancy means.

Once the plants have outgrown seed germinating sub-raft 54 and the sub-rafts have been separated from each other, sub-rafts 54 may be transrafted onto auxilary raft or buoyancy means 72, which in turn can later be transrafted on still larger auxiliary raft or buoyancy means 73 (FIG. 6). In order to facilitate transrafting, the auxiliary raft 72 may be formed with a slot 74 extending from the outer periphery 76 of auxiliary raft 72 to an inner root receiving channel 77 of raft 72. Slot 74 is dimensioned for passage of the root system of the plant therethrough during transrafting so that it is not necessary to thread the roots downwardly through channel 77 from the top of the raft 72. This construction is particularly advantageous for use with lettuce which may have a root system as long as one meter in length during mature plant stages.

Similarly, raft 73 is formed with a slot 78 which extends from outer periphery 79 to inner channel 81. It should also be noted that it is preferable to angularly displace the locations of the respective channels 74 and 78 so as to assist in balancing the buoyant forces.

The apparatus of the present invention is well suited for the growth of lettuce, and particularly head lettuce, often known as iceberg lettuce. Usually seeds are placed on a raft means, such as multi-unit rafts 21 or 51, and the rafts are placed in tank 35 for the purpose of germination. The seeds are placed on a porous membrane, such as a frangible cheesecloth layer 26 or foamed partiton 58, or the seeds can be placed on wicks which are draped into openings 27 and 56. It is not absolutely necessary, however, that the seeds be germinated on the raft means.

Once the seeds have germinated and are in their seedling stage, they are inspected and transferred to a seedling growth tank. After the seedling stage the plants are again inspected and may be transferred to an additional tank for the first substantial growth stage. This step can also include transrafting the seedlings to larger auxiliary raft means.

During all stages of growth, the amount of lighting which each plant receives can be varied, and the use of rafts enables the plants to be urged over the nutrient solution past lighting and other processing stations.

Thus, the rafts enable a materials handling approach to such processing steps as fumigation, nutrient pasteurization, infrared irradiation, $CO_2$ atmosphere control, temperature change, and the speed of growth for high or low market demand.

Finally, it should be noted that it is preferably to substantially cover the top surface of the nutrient solution with either raft means or plants, whichever is larger. The cover provided by the raft means and/or plants allows better control of the nutrient solution. Thus, the temperature can be more easily maintained, and the growth of algae or the like can be controlled.

What is claimed is:

1. Raft means for the hydroponic growth of at least one plant thereon including a raft body formed to float on a nutrient solution in a stable position, said body being formed with a generally vertically oriented channel extending from a foliage supporting upwardly facing side of said body through said body to a nutrient solution contacting downwardly facing side of said body, said channel having a transverse dimension formed for receipt of the stem of a plant therein with the root system of said plant depending downwardly into said nutrient solution, and said body having sufficient buoyancy to float said plant on said nutrient solution and said body extending laterally in all directions from said channel a distance sufficient to support the foliage of said plant above said nutrient solution during a substantial portion of the growth cycle of said plant, wherein the improvement in said raft means comprises:
auxiliary buoyancy means engaging said body and formed to assist in the buoyant support of said body on said nutrient solution by providing auxiliary stability and buoyancy for said body, said auxiliary buoyancy means being formed with a generally vertically oriented auxiliary channel in substantially aligned registration with said channel in said body, and said auxiliary channel being dimensioned for downward depending of the root system of said plant therethrough.

2. Raft means as defined in claim 1 wherein said auxiliary buoyancy means is formed with a slot extending from the periphery thereof to said auxiliary channel, said slot being dimensioned for passage of the root system of said plant therealong.

3. Raft means as defined in claim 1 wherein,
said auxiliary buoyancy means incudes registratiion means formed proximate a top surface of said auxiliary buoyancy means for receipt and securement of said body against lateral displacement relative to said auxiliary buoyancy means.

4. Raft means as defined in claim 1 wherein, said registration means if formed as a recess in said top surface of said auxiliary buoyancy means formed for receipt of a portion of said body therein.

5. Raft means as defined in claim 1 wherein, said auxiliary buoyancy means further having an area laterally of said auxiliary channel sufficient to space an adjacent raft means at a distance from the first named raft means of unimpeded growth of said plant.

6. Raft means for the hydroponic growth of at least one plant including a raft body formed to float on a nutrient solution in a stable position, said body being formed with a generally vertically oriented channel extending from a foliage supporting upwrdly facing side of said body through said body to a nutrient solution contacting downwardly facing side of said body, said body being formed of a molded plastic foam having sufficient buoyancy and extending laterally of said channel for support of the foliage of said plant above said nutrient solution over a substantial portion of the growth cycle of the plant, and said body further including partition means extending transversely Across said channel at a height causing said partition to normally be in contact with said nutrient solution when said raft means is floated thereon, said partition further having a thickness sufficient to support a plant seed thereon and being sufficiently thin to enable growth of the plant root system therethrough, wherein the improvement in said raft means comprises:
said body being formed with a downwardly facing annular recess proximate said partition to define a wall of reduced thickness proximate said partition, and said body is further formed with an upwardly facing annular recess surrounding said channel and providing a relief space into which the wall of said body defining said channel may be readilly displaced during plant growth.

7. Raft means for the hydroponic growth of at least one plant including a raft body formed to float on a nutrient solution in a stable position, said body being formed with a generally vertically oriented channel extending from a foliage supporting upwardly facing side of said body through said body to a nutrient solution contacting downwardly facing side of said body, said body being formed of a molded plastic foam having sufficient buoyancy and extending laterally of said channel for support of the foliage of said plant above said nutrient solution over a substantial portion of the growth cycle of the plant, wherein the improvement in said raft means comprises:
said body being formed with a wall defining said channel formed for radially outward displacement by the stem of said plant as said plant grows.

* * * * *

UNITED STATES PATENT OFFICE
CERTIFICATE OF CORRECTION

Patent No. 4,037,360                    Dated July 26, 1977

Inventor(s) Robert S. Farnsworth

It is certified that error appears in the above-identified patent and that said Letters Patent are hereby corrected as shown below:

Column 1, line 11, "prodcedures" should read -- procedures --.
         line 28, "aout" should read -- about --.
         line 48, after "roots" should read -- ( --.
         line 52, "called" should read -- celled --.
         line 54, "of" second occurrence, should read -- or --.
         line 64, "enchances" should read --enhances --.

Column 2, line 4, "plant" should read -- plants --.
         line 15, "contruct" should read -- construct --.
         line 21, "frpom" should read -- from --.

Column 3, line 6, "mens" should read -- means --.
         line 30, after "plants" should read --are --;
         line 46, "and" should read -- can --.

Column 4, line 32, "Additon-" should read -- Addition- --.
         line 44, "addtion" should read -- addition --.

Column 5, line 16, "partion" should read -- partition --.
         line 16, "communicaion" should read -- communication --.
         line 59, "achived" should read -- achieved --.

Column 7, line 6, "preferably" should read -- preferable --.

UNITED STATES PATENT OFFICE
CERTIFICATE OF CORRECTION

Patent No. 4,037,360          Dated July 26, 1977

Inventor(s) Robert S. Farnsworth

It is certified that error appears in the above-identified patent and that said Letters Patent are hereby corrected as shown below:

Column 8, line 1, "if" should read -- is --.
            line 8, "of" first occurrence, should read -- for --.
            line 13, "upwrdly" should read -- upwardly --.
            line 21, "Across" should read -- across --.
            line 35, "readilly" should read -- radially --.

Signed and Sealed this

Second Day of January 1979

[SEAL]

Attest:

RUTH C. MASON
*Attesting Officer*

DONALD W. BANNER
*Commissioner of Patents and Trademarks*